US007144166B2

(12) United States Patent
Raman

(10) Patent No.: US 7,144,166 B2
(45) Date of Patent: Dec. 5, 2006

(54) SYSTEM FOR SECURE PRINTING

(75) Inventor: Gopalan Raman, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/066,896

(22) Filed: Feb. 25, 2005

(65) Prior Publication Data

US 2005/0185014 A1 Aug. 25, 2005

Related U.S. Application Data

(62) Division of application No. 09/698,644, filed on Oct. 27, 2000, now Pat. No. 6,902,331.

(51) Int. Cl.
*H04N 1/32* (2006.01)

(52) U.S. Cl. .............................. 400/62; 347/5; 380/51; 380/55; 358/3.28; 283/73; 283/113

(58) Field of Classification Search .................. 400/61, 400/62; 347/3, 5; 380/51, 55; 358/3.28; 283/73, 74, 113, 114
See application file for complete search history.

(56) References Cited

U.S. PATENT DOCUMENTS 5,038,153 A * 8/1991 Liechti et al. ................. 347/4
5,257,119 A * 10/1993 Funada et al. .............. 358/438
5,659,342 A 8/1997 Lund
5,681,381 A 10/1997 Auslander
5,734,752 A 3/1998 Knox
5,944,881 A 8/1999 Mehta
6,072,871 A * 6/2000 Ur .............................. 380/51
6,285,776 B1 * 9/2001 Rhoads ....................... 382/100
6,334,678 B1 1/2002 Daigneault
6,349,972 B1 2/2002 Geiger
6,431,704 B1 8/2002 Silverbrook
6,646,764 B1 * 11/2003 Wataya ...................... 358/3.28
6,707,564 B1 * 3/2004 Fujimoto et al. .......... 358/1.14
2002/0106492 A1 8/2002 Murcia

* cited by examiner

*Primary Examiner*—Daniel J. Colilla
*Assistant Examiner*—Kevin D. Williams

(57) ABSTRACT

The present disclosure relates to a method for printing a secure image on media using an inkjet printing device. The method includes printing an underlayer using an inkjet printing device that penetrates into a front surface of media. The underlayer is configured to define identification indicia. Included in the method is printing a secure image on top of the underlayer using an inkjet printing device. Examination of a back surface opposite the front surface allows viewing of the identification indicia for authenticating the secure image.

5 Claims, 7 Drawing Sheets

SYSTEM FOR SECURE PRINTING

This is a Divisional Application of U.S. application Ser. No. 09/698,644, filed on Oct. 27, 2000, now issued U.S. Pat. No. 6,902,331.

BACKGROUND OF THE INVENTION

The present invention relates to inkjet printing devices for printing secure images on media.

Inkjet printing systems frequently make use of an inkjet printhead mounted to a carriage which is moved back and forth across print media such as paper. As the printhead is moved across the print media, a control device selectively activates each of a plurality of drop generators within the printhead to eject or deposit ink droplets onto the print media to form images and text characters. An ink supply that is either carried with the printhead or remote from the printhead provides ink for replenishing the plurality of drop generators.

Individual drop generators are selectively activated by the use of an activation signal that is provided by the printing system to the printhead. In the case of thermal inkjet printing, each drop generator is activated by passing an electric current through a resistive element such as a resistor. In response to the electric current the resistor produces heat, that in turn, heats ink in a vaporization chamber adjacent the resistor. Once the ink reaches vaporization, a rapidly expanding vapor front forces ink within the vaporization chamber through an adjacent orifice or nozzle. Ink droplets ejected from the nozzles are deposited on print media to accomplish printing.

There is frequently a need to print documents that can be verified as original documents. Documents that can be verified as original documents are referred to herein as "secure" documents. Several examples of documents that require verification of their originality would be desirable include tickets, coupons, and various types of certificates, to name a few. For these printing applications it is necessary that the source of the document be verifiable by examination of the document. The technique used to identify the source of the document should be difficult to duplicate using readily available duplication systems such as copiers and scanners to prevent counterfeiting of the document.

There is an ever-present need for techniques for secure printing using inkjet printing technology. These techniques should be capable of allowing the source of the printed media to be identifiable without adding significant costs to the printing system. These techniques should be suitable for use with standard media. Finally, these techniques for authenticating original inkjet et printed documents should be reliable and easily accomplished.

SUMMARY OF THE INVENTION

One aspect of the present invention is a method for printing a secure image on media using an inkjet printing device. The method includes printing an underlayer using an inkjet printing device that penetrates into a front surface of media. The underlayer is configured to define identification indicia. Included in the method is printing a secure image on top of the underlayer using an inkjet printing device. Examination of a back surface opposite the front surface allows viewing of the identification indicia for authenticating the secure image.

Another aspect of the present invention is an inkjet printing device for secure printing. The inkjet printing device includes an input device for receiving image information for specifying images to be printed. Included is a storage device for storing identification indicia information. Also included is a control device for selecting between the input device and the storage device. The control device selects information from each of the first input device and the storage device for each image printed.

DETAILED DESCRIPTION OF THE PREFERRED EMBODIMENT

Figure 1:
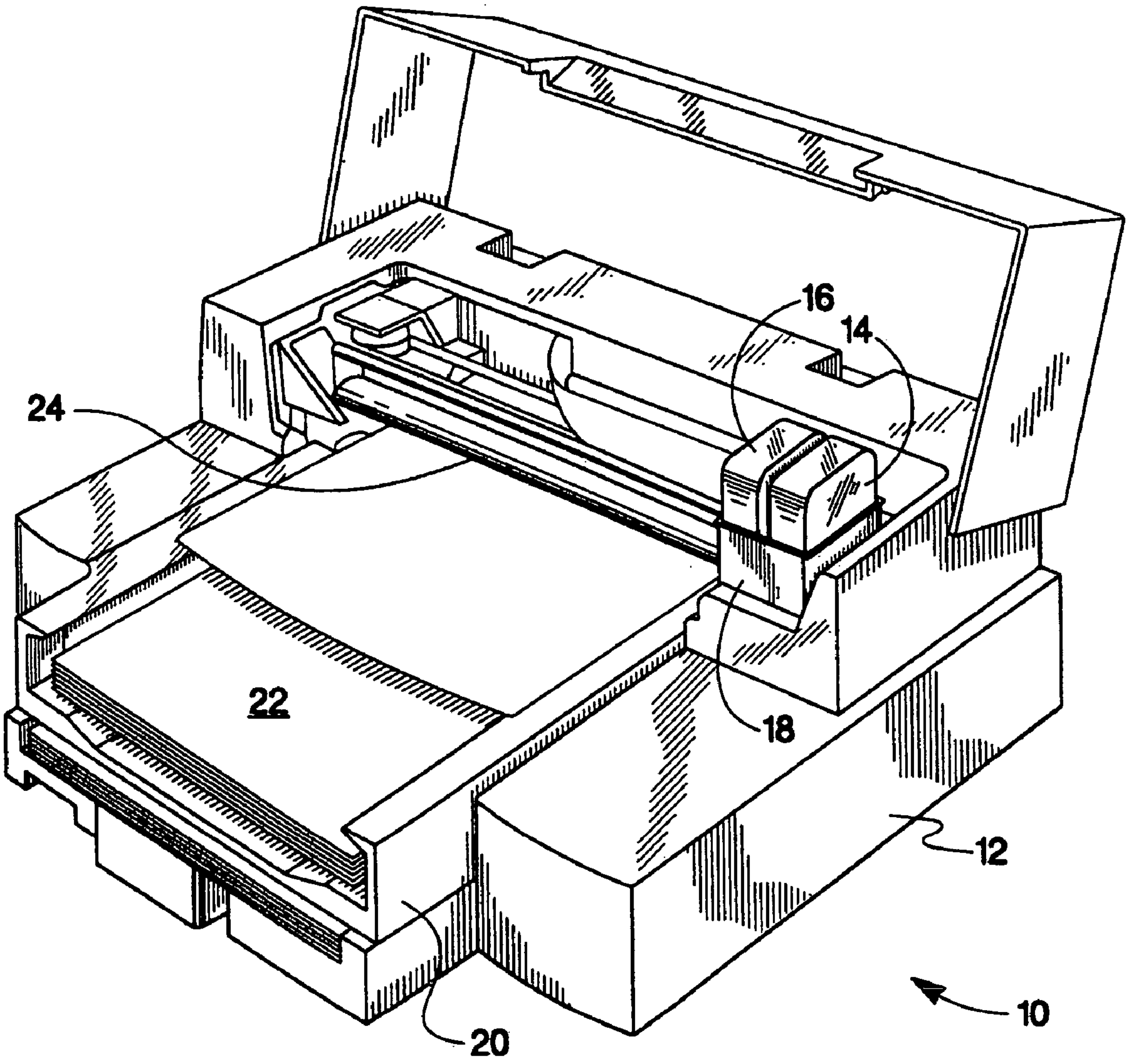
FIG. 1 is a top perspective view of an inkjet printing system of the present invention for accomplishing secure printing on print media.

FIG. 1 is a perspective view of one exemplary embodiment of an inkjet printing system 10 of the present invention shown with its cover open. The inkjet printing system of the present invention, as will be discussed in more detail, allows secure documents to be printed. In one exemplary embodiment, the inkjet printing system 10 includes a printer portion 12 having at least one print cartridge 14 and 16 installed in a scanning carriage 18. The printing portion 12 includes a media tray 20 for receiving media 22. As the print media 22 is stepped through a print zone 24, the scanning carriage 18 moves the print cartridges 14 and 16 across the print media 22. The printer portion 12 selectively activates drop generators within a printhead portion (not shown) associated with each of the print cartridges 14 and 16 to deposit ink on the print media.

In the exemplary embodiment, the cartridge 14 is a three-color cartridge containing cyan, magenta, and yellow inks. In this exemplary embodiment, a separate print cartridge 16 is provided for black ink. The present invention will herein be described with respect to this preferred embodiment by way of example only. There are numerous other configurations in which the method and apparatus of the present invention is also suitable. For example, the present invention is suited to configurations wherein the printing system contains separate print cartridges for each color of ink used in printing. Alternatively, the present invention is applicable to printing systems wherein more than four ink colors are used such as in high fidelity printing wherein six or more colors are used. Finally, the present invention is applicable to printing systems that make use of various types of print cartridges such as print cartridges which include a printhead portion and a separate ink container portion, spaced from the printhead, that used to either continuously or intermittently replenish the printhead portion with ink.

The ink cartridge 14 and 16 shown in FIG. 1 includes a printhead portion (not shown) that is responsive to activation signals from the printing system 12 for selectively depositing ink on media 22. In the exemplary embodiment, the print cartridges 14 and 16 each include a plurality of electrical contacts that are disposed and arranged on the print cartridge so that when properly inserted into the scanning carriage 18, electrical contact is established between corresponding electrical contacts associated with the printer portion 12. In this matter, activation signals from the printer portion 12 are provided to the inkjet printhead for ejecting ink.

Figure 2:
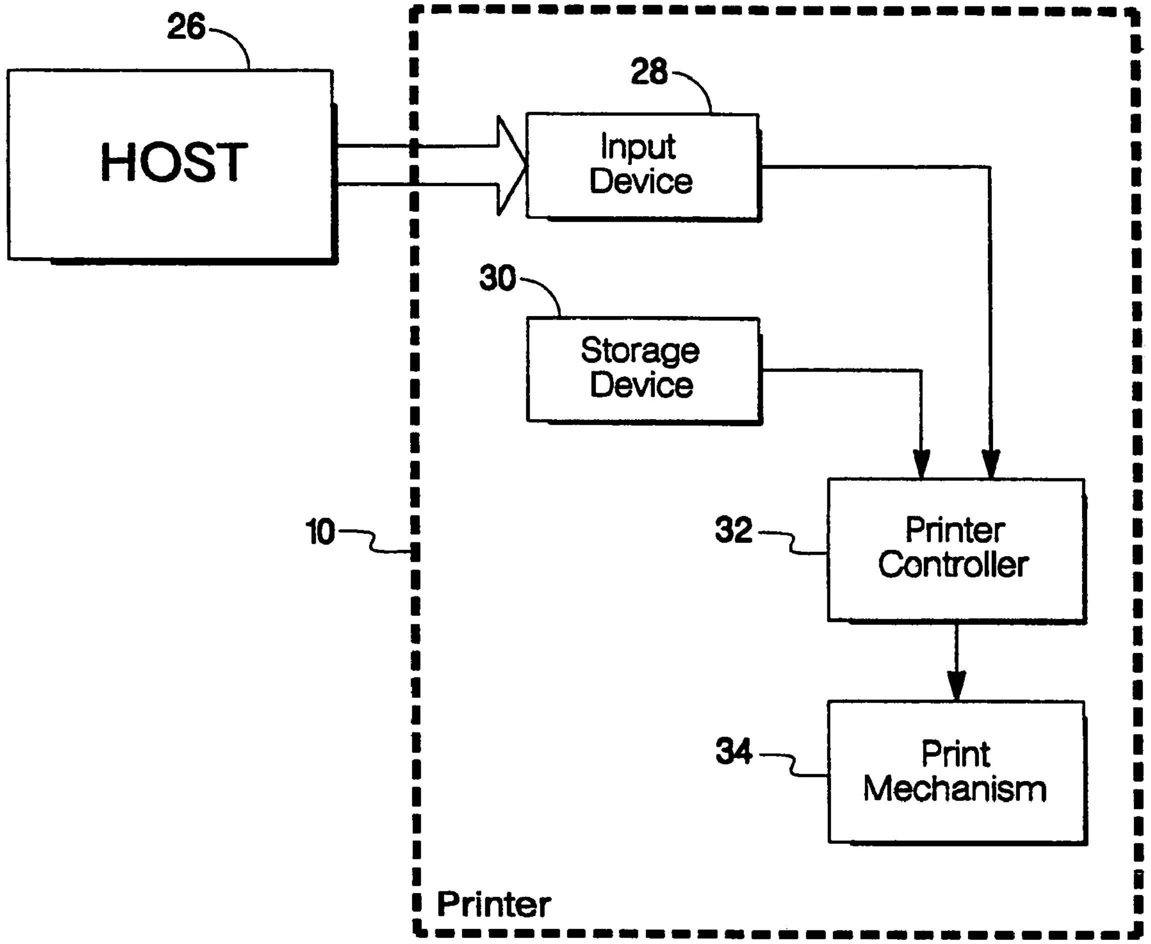
FIG. 2 is block diagram of the inkjet printing system of FIG. 1 shown connected to a host device.

FIG. 2 depicts a simplified electrical block diagram of the printer portion 12 shown connected to an information source or host device 26. The host 26 represents a source of the image to be printed. The host 26 is a computer, processor or any other device that provides an image to be printed to the printing system 10. The image provided by the host 26 is in one of a number of types, such as, an image description using an image description language or a bit map images. Some examples of the host 26 are a personal computer (pc), a digital camera or an internet link for directly receiving image information from an internet source, to name a few.

The printer portion 12 includes an input device 28 for receiving information from the host 26 and a storage device 30 for storing image information. The printing device 12 further includes a printer controller 32 capable of selectively receiving image information from each of the input device 28 and the storage device 30. The printer controller 32 provides image information to the print mechanism 34. The print mechanism 34 provides control signals to a media transport device for transporting media 22 through the print zone 24. In addition, the print mechanism 34 includes a carriage transport device for controlling movement of the carriage 18 through the print zone 24 as the printer controller 32 selectively activates the inkjet printhead on each of the cartridges 14 and 16 to selectively form images on print media 22.

Although, the printing system 10 is described herein as having a printhead that is disposed in a scanning carriage 18, there are other arrangements of achieving relative movement between the printhead and media 22. For example, the printing system 10 can also be configured to have a fixed printhead portion and wherein the media 22 is moved past the fixed printhead or another example is where the media 22 is fixed and the printhead is moved past the fixed media 22, to name a few.

The input device 28 receives the image information from the host 26 and converts this image information into a format suitable for the printer controller 32. The input device 28 typically performs various process functions as well as buffering functions on image information prior to providing this information to the printer controller 32.

The storage device 30 stores image information for identifying a source of the image to be printed. This identification information can be unique to the particular printing system 10 or can be unique to a particular or user or organization. This image information stored in the storage device 30 is used by the printer controller 32 and the print mechanism 34 for providing identification indicia on the print media 22 for identifying the particular printing system 10 responsible for printing the image on media 22. The identification information stored in the storage device 30 is either loaded into the storage device 30 from a remote source or is loaded by the printer portion 10. In the case where the printer portion 10 loads the identification information, this information is derived from the image to be printed or altered by the image to be printed. The image is stored in each of the input device 28 and the storage device 30 will now be discussed with respect to FIGS. 3, 4, and 5 by way of example in order to illustrate the technique of the present invention.

Figure 3A:
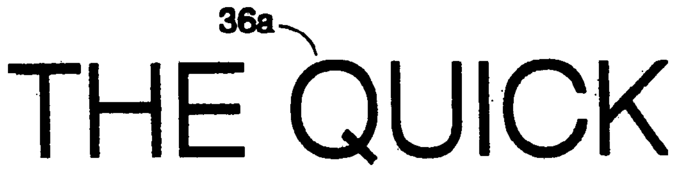
FIGS. 3*a* and 3*b* represent exemplary text and graphic images for printing using the printing system of the present invention.
Figure 3B:
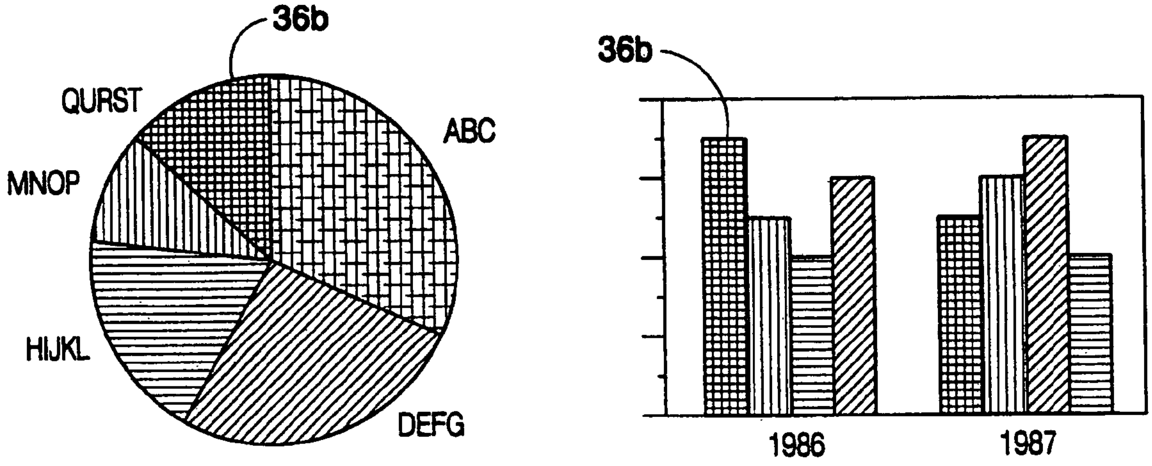

FIGS. 3*a* and 3*b* are exemplary images 36*a* and 36*b* to be printed by the printing system 12. These images are typically images that are received by the input device 28 from the host or source of image information 26. FIG. 3*a* represents a text image 36*a* and FIG. 3*b* represents a graphic image 36*b*. Both of the exemplary images are formed using black ink. The images to be printed can alternatively be other colors as well. Alternatively, the image 36*a* and 36*b* that are sent by the host 26 could also be a gray scale image such as a binary representation of a continuous tone image. One example of a continuous tone image is a photograph that is then digitized to produce a binary representation of the photograph.

Figure 4A:
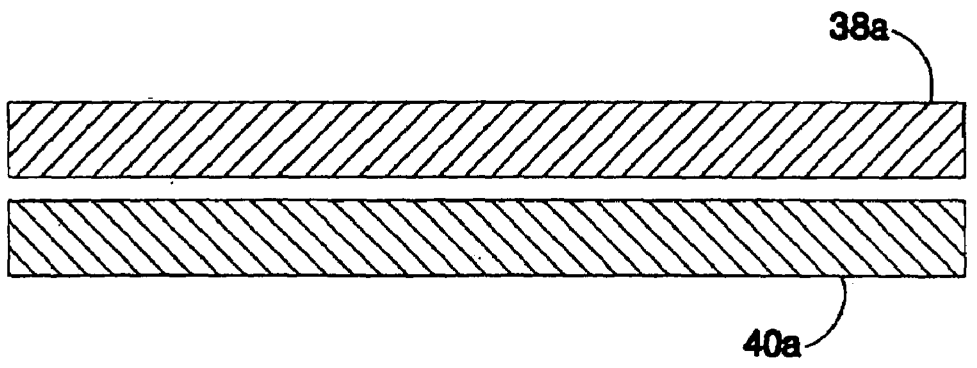
FIGS. 4*a* and 4*b* represent exemplary underlayers for printing using the printing system of the present invention.
Figure 4B:
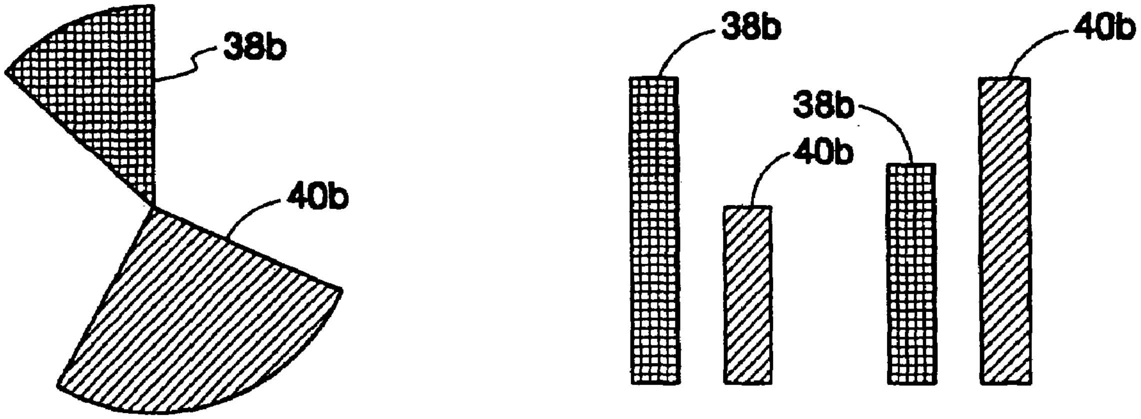

FIGS. 4*a* and 4*b* represent identification information or an indicia 38*a*, 38*b*, 40*a*, 40*b* that can be stored in the storage device 30. The identification indicia in FIG. 4*a* includes a first indicia 38*a* and a second indicia 40*a*. The identification indicia 38*a*, 38*b*, 40*a*, 40*b* are shown as cross-hatched regions that represent areas of ink coverage. These regions are formed using small drops of ink to deposit a pattern or shape. These patterns are formed so that they are visible from either the back of the media or front side of the media as will be discussed latter. The indicia 38*a* and 40*a* are selected to be an ink color that is different from the ink color of the image to be printed 36*a*. In this exemplary embodiment, the first indicia 38*a* is formed using cyan ink and the second indicia 40*a* is formed using magenta ink. The first and second indicia 38*a* and 40*a* colors are selected to be different from the black ink used to print the image to be printed 36*a*. The first and second indicia 38*a* and 40*a* can be formed using other ink colors as well.

In this exemplary embodiment, each indicia is formed using small well-spaced droplets of ink. The media 22 is selected to be a media that allows ink to penetrate into the media 22. Various types of media manufactured by media manufacturers such as Union Camp and Jamestown allow ink to penetrate into the media 22. The ink droplet spacing is selected based on drop volume as well as media penetration so that the indicia 38*a* and 40*a* are not visible when viewed under normal lighting conditions.

FIG. 4*b* shows alternative indicia 38*b* and 40*b* that are stored in the storage device 30 in the printing system 10. The indicia 38*b* and 40*b* in FIG. 4*b*, in contrast to the indicia in FIG. 4*a*, are selected to be related to the image 36*b* to be printed shown in FIG. 3*b*. In this exemplary embodiment, the indicia 38*b* and 40*b* includes a portion 38*b* formed using cyan ink and a portion 40*b* formed using magenta ink. Each of the cyan portion 38*b* and the magenta portion 40*b* are selected based on the image to be printed 36*b* shown in FIG. 3*b*. The identification indicia 38*b* and 40*b* in FIG. 4*b* has portions that are configured to correspond to a shape of the image to be printed 36*b* in FIG. 3*b*. The identification indicia 38*b* and 40*b* in FIG. 4*b* are formed using cyan and magenta inks instead of black ink shown in FIG. 3*b*. As will be discussed with respect to FIG. 5*b* it is important that the identification indicia 38*b* and 40*b* in FIG. 4*b* be formed to be completely covered by the image to be printed 36*b* in FIG. 3*b* when this image 36*b* is overprinted on the identification indicia 38*b* and 40*b*.

Figure 5A:
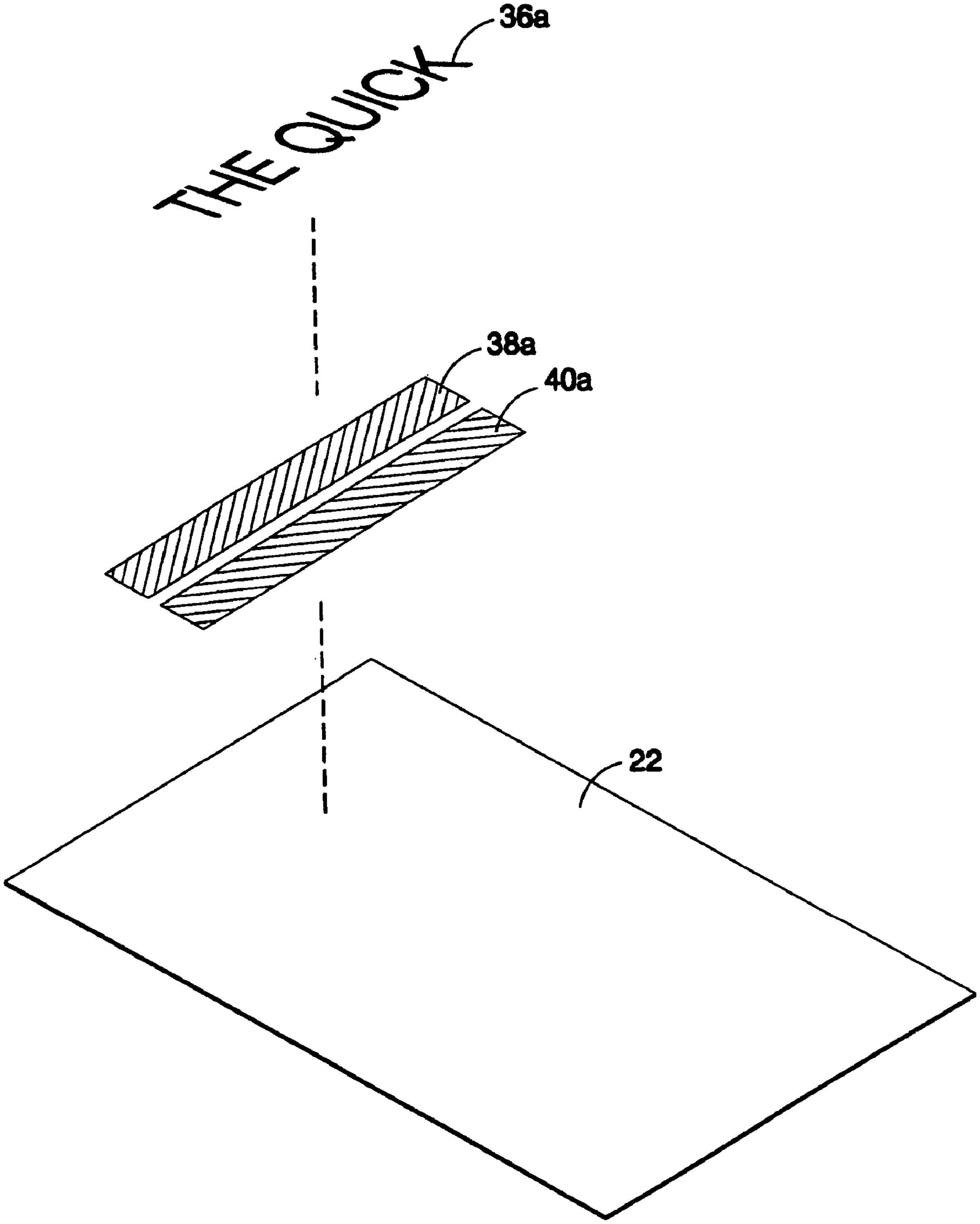
FIGS. 5*a* and 5*b* is an exploded view representing the text and graphic images of FIGS. 3*a* and 3*b* printed over the underlayer shown in FIGS. 4*a* and 4*b*, respectively, using the printing system of the present invention.
Figure 5B:
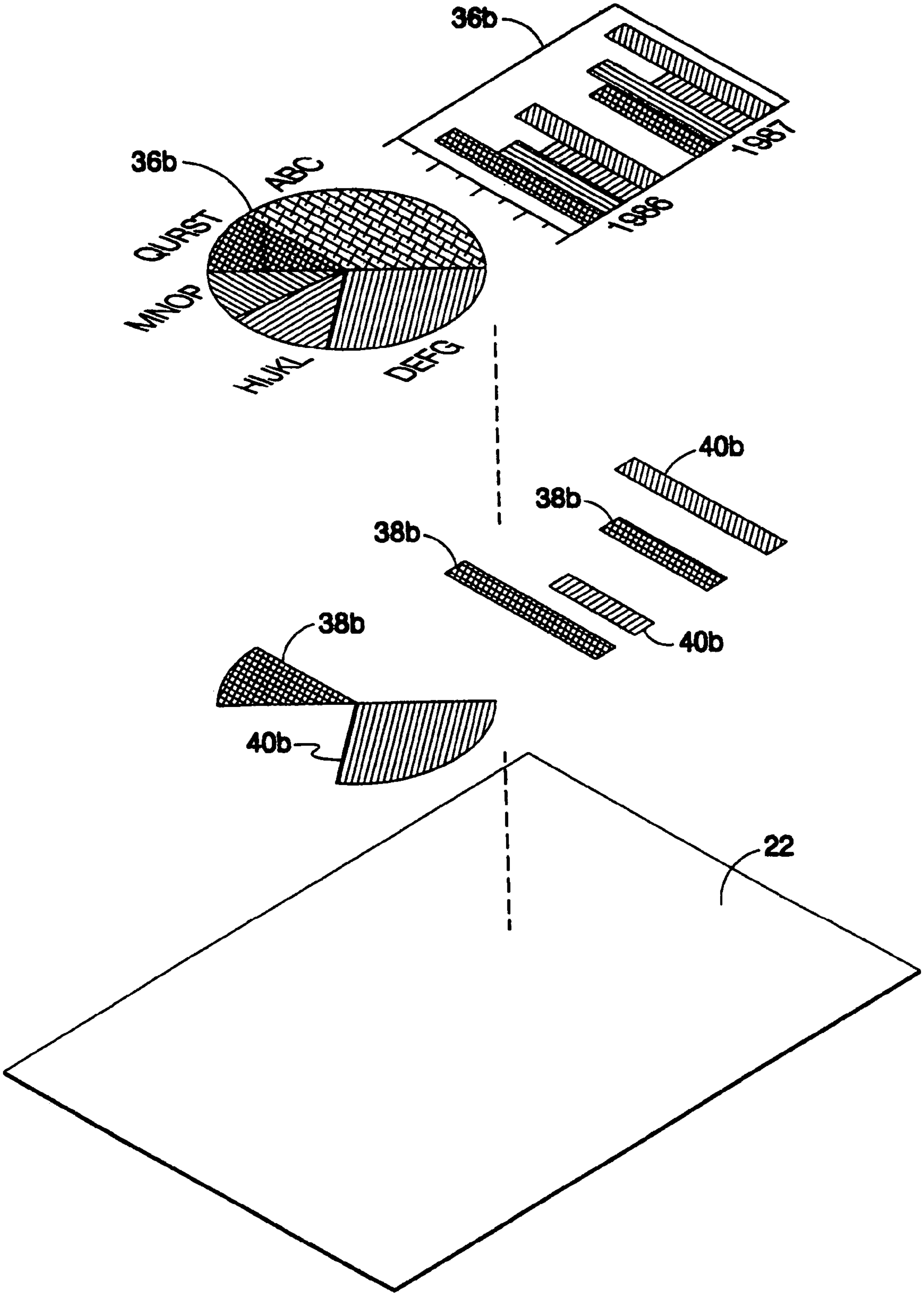

FIGS. 5*a* and 5*b* illustrates the technique of the present invention whereby the identification indicia 38*a*, 38*b*, 40*a*, 40*b* are printed prior to the image to be printed 36*a*, 36*b*. The image to be printed 36*a* and 36*b* is printed over the respective identification indicia. The backside of the media 22 can then be examined for the identification indicia 38*a*, 38*b*, 40*a*, 40*b* to identify the printing system 10 to authenticate the image.

As shown in FIGS. 5*a* and 5*b* the combined image resulting from printing the identification indicia 38*a*, 38*b*, 40*a*, 40*b* that is printed as an underlayer and the image to be printed 36*a* and 36*b* that is printed as an overlayer. As is shown in FIG. 5*a*, the image to be printed 36*a* only partially covers the underlayer or identification indicia 38*a* and 40*a*. However, as discussed previously, the underlayer or identification indicia 38*a* and 40*a* are printed sufficiently light so as to not be visible when viewing the media 22 under normal light. FIG. 5*b*, in contrast, the underlayer or identification indicia 38*b* and 40*b* are completely hidden by the overlayer or image to be printed 36*b*. Because the underlayers or identification indicia 38*b* and 40*b* are completely covered by the overlayer or image to be printed 36*b*, the underlayer can be formed using a larger amount of ink than the case when the underlayer 38*a* and 40*a* is not hidden shown in FIG. 5*a*.

Once both the underlayer 38*a*, 38*b*, 40*a*, and 40*b* is printed and the overlayer 36*a*, and 36*b* are printed, the image is complete. The complete image is formed so that the underlayer 38*a*, 38*b*, 40*a*, and 40*b* is not sufficiently visible to be duplicated using a copier or scanner thereby preventing counterfeiting of the complete image. The printed image can then be viewed from the backside opposite the printed side to view the underlayer 38*a*, 38*b*, 40*a*, and 40*b* to identify this source of the image. Alternatively, for the case where the underlayer 38*a*, 40*a* is not completely covered by the overlayer 36*a* as shown in FIG. 5*a* then the underlayer can be partially viewed from the from front side of the completed image to identify this source of the image. The underlayer in FIG. 5*a* is viewed under special light or using an instrument to detect the identification indicia 38*a* and 40*a* from the backside or front side of media 22. The underlayer in FIG. 5*b* can be viewed without special light or instrument to view identification indicia 38*b* and 40*b*. Because the underlayer 38*a*, 38*b*, 40*a*, and 40*b* are characteristic to the particular printer, then the viewing of the underlayer can be used to identify the particular printer. In this manner, an inkjet printed image can be authenticated and in this regard, this technique allows secure printing.

While the underlayers 38*a*, 38*b*, 40*a*, and 40*b* as shown as simple rows or bars of color as shown in FIG. 4*a* for graphic images as shown in FIG. 4*b*, these images can be a variety of shapes and patterns to uniquely identify the particular printer that printed the image. In addition, the underlayer can be related to the image that is to be printed as shown in FIG. 4*b*. This is useful when a large number of images are to be printed such as a large number of certificates to be printed, the pattern for the underlayer can then be stored in the storage device 30 for use in printing each of the certificates. In this manner, the underlayer is configured to be hidden by the overlayer while still producing a unique indicia for identifying the printing system that printed the image.

Figure 6:
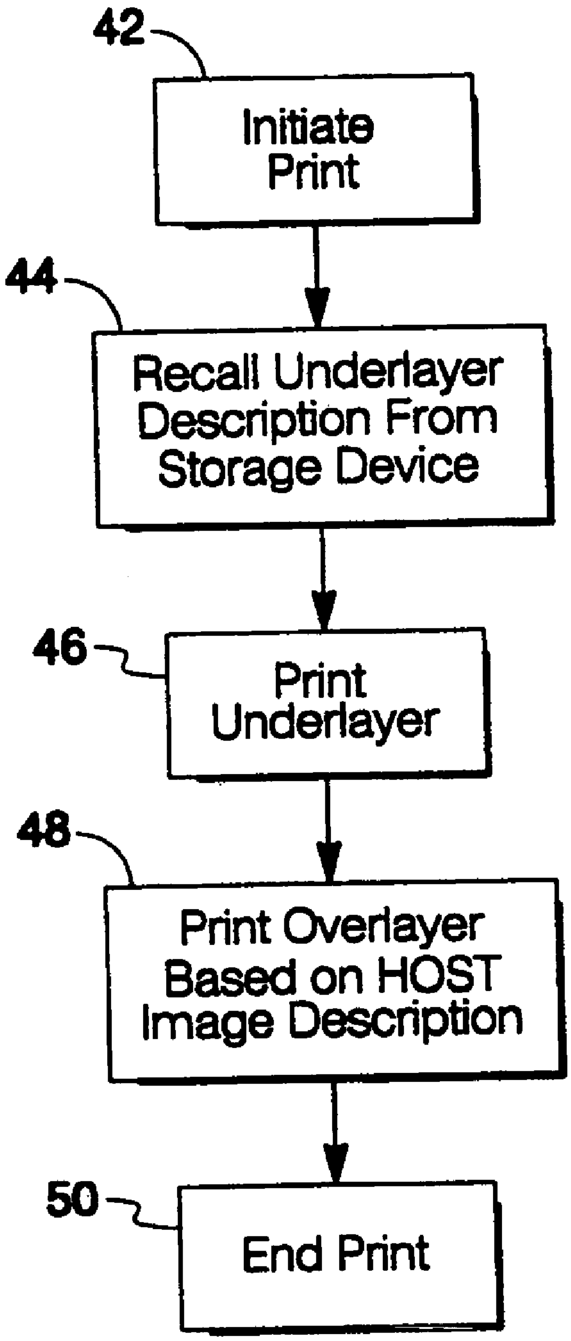
FIG. 6 is a flow diagram depicting the method of the present invention for printing a secure document.

In operation, an image to be printed is provided to the printing system 12 as represented by step 42 in FIG. 6. The printer controller 32 within the printing system 10 recalls an image description from the storage device 30 as represented in step 44. The printing system 10 then prints the underlayer based on the image description recalled from the storage device 30. An overlayer is then printed based on the image description provided by the input device 28 as represented by step 48. The secure document, having both an underlayer and overlayer, is then complete as represented by step 50. The present invention provides an economical way of printing secure documents. This technique allows the backside of the document to be reviewed either visually or using a special scanning device to read the underlayer from the backside for reading the characteristic image of the printing system 10. The image can then be matched with the characteristic image of the printer 10 to authenticate the document as to the source or origination of the document.

The present invention has been described herein with respect to thermal inkjet et printing, however, there are other ink droplet ejection devices that are also suitable. The technique of the present invention is suitable for drop ejection devices that allow for ink droplets to be accurately deposited on media. Examples of these drop ejection devices, other than thermal inkjet, include piezo ejection devices and flex tensional ejection devices, to name a couple.

What is claimed is:

1. An inkjet printing device for secure printing comprising:

an input device for receiving image information to be printed as a secure image;

a storage device operatively coupled to the input device for storing indentification indicia information, the identification indicia information indicating a source of the secure image, the shape of the identification indicia information being derived from the shape of the secure image;

a control device operatively coupled to the storage device and the input device and being configured to selectively access the stored identification indicia information and the image information and output the identification indicia information and the image information; and a print mechanism operatively coupled to the control device and configured to receive the identification indicia information and the image information, the print mechanism printing the identification indicia information as an underlayer and the image information as an overlayer.

2. The inkjet printing device of claim 1 wherein the storage device is an electric storage device.

3. The inkjet printing device of claim 1 wherein the printing device is configured to print the underlayer using one of cyan and magenta ink colors.

4. The inkjet printing device of claim 1 wherein the input device generates the identification indicia information by altering existing identification information stored within the inkjet printing device based on the received image information.

5. The inkjet printing device of claim 1 wherein the input device generates the identification indicia information by altering identification information received from a source that is remote to the inkjet printing device based on the received image information.

* * * * *

UNITED STATES PATENT AND TRADEMARK OFFICE

CERTIFICATE OF CORRECTION

PATENT NO. : 7,144,166 B2 
APPLICATION NO. : 11/066896
DATED : December 5, 2006
INVENTOR(S) : Gopalan Raman It is certified that error appears in the above-identified patent and that said Letters Patent is hereby corrected as shown below:

In column 1, line 51, after "inkjet" delete "et".

In column 6, line 14, after "inkjet" delete "et".

In column 6, line 29, in Claim 1, delete "indentification" and insert -- identification --, therefor.

Signed and Sealed this

Sixteenth Day of December, 2008

JON W. DUDAS
*Director of the United States Patent and Trademark Office*